United States Patent
Tanaka

[11] Patent Number: 6,026,244
[45] Date of Patent: Feb. 15, 2000

[54] FOCUS ADJUSTMENT MECHANISM AND METHOD FOR THE ASSEMBLY OF AF COMPACT CAMERA

[75] Inventor: Hitoshi Tanaka, Saitama-ken, Japan

[73] Assignee: Asahi Kogaku Kogyo Kabushiki Kaisha, Tokyo, Japan

[21] Appl. No.: 09/022,118

[22] Filed: Feb. 11, 1998

[30] Foreign Application Priority Data

Feb. 12, 1997 [JP] Japan ................................. 9-027951
Feb. 12, 1998 [JP] Japan ................................. 9-027951

[51] Int. Cl.⁷ ................................................. G03B 17/00
[52] U.S. Cl. .......................... 396/72; 396/144; 396/146; 359/699; 359/700; 359/704; 359/823; 359/826
[58] Field of Search ................................. 396/146, 529, 396/72, 144; 359/699, 700, 704, 823, 826

[56] References Cited

U.S. PATENT DOCUMENTS

| | | | |
|---|---|---|---|
| 5,446,593 | 8/1995 | Hamasaki et al. . | |
| 5,467,227 | 11/1995 | Nomura | 359/699 |
| 5,581,411 | 12/1996 | Nomura et al. | 359/704 |
| 5,594,589 | 1/1997 | Chen | 359/826 |
| 5,613,168 | 3/1997 | Kawano et al. . | |
| 5,831,778 | 11/1998 | Chuch | 359/823 |
| 5,912,772 | 6/1999 | Aoki | 359/701 |

*Primary Examiner*—Russell Adams
*Attorney, Agent, or Firm*—Greenblum & Bernstein P.L.C.

[57] ABSTRACT

A focus adjustment mechanism upon assembly of an AF compact camera includes a shutter having a focusing lens frame which is screw-engaged therein, and a ring-shaped connecting member with an arm to be engaged with an AF driving lever of the shutter and to be fixed to the lens frame. The lens frame is provided with a cylindrical engagement surface to which the ring-shaped connecting member is engaged from the front end thereof and a plurality of engaging portions to be engaged with an adjuster for rotation of the lens frame. The adjuster comprises a plurality of corresponding engaging portions to rotate the lens frame.

6 Claims, 4 Drawing Sheets

FOCUS ADJUSTMENT MECHANISM AND METHOD FOR THE ASSEMBLY OF AF COMPACT CAMERA

BACKGROUND OF THE INVENTION

1. Field of the Invention

The present invention relates to a focus adjustment mechanism and method for a focusing lens of an AF (auto focus) compact camera upon assembly thereof.

2. Description of the Related Art

An AF compact camera has an annular shaped shutter unit. The shutter unit has a female helicoid at the center thereof with which a male helicoid of a lens frame of a focusing lens is engaged. The shutter unit is also provided with an AF driving lever to be rotatively driven along an arc of which its axis is substantially common to that of the female helicoid. The AF driving lever is interlocked with the focusing lens frame via an arm of a ring-shaped connecting member fixed on the lens frame. The AF driving lever is normally maintained at an infinity photographic position, and when the shutter is released, the AF driving lever is driven by an amount corresponding to the object distance information.

Upon assembly of this AF compact camera, the ring-shaped connecting member and the lens frame are allowed to rotate relative to each other, thus the lens frame which is engaged with the shutter unit is moved (rotated) to a predetermined position (for example, an infinity photographic position). Then the AF driving lever as well as the ring-shaped connecting member, which is engaged therewith, are both maintained at the common infinity photographic position. After completion of this adjustment, the lens frame and the ring-shaped connecting member are fixed together (for example, by an adhesive). In the case that the AF compact camera is a zoom lens, a zoom adjustment is further carried out by setting the AF lever at a distance corresponding to an adjusting collimator.

For this focus adjustment upon assembly, in prior arts, a circular groove has usually been formed on the lens frame which only allows rotation of the ring-shaped connecting member by prohibiting movement of the ring-shaped connecting member in an optical axis direction. However, the current AF compact cameras are continuously becoming more and more compact so that there may be a case that it is difficult to form such a circular groove.

SUMMARY OF THE INVENTION

It is an object of the present invention to provide a focus adjustment mechanism upon assembly which can carry out the above described focus adjustment upon assembly without requiring the circular groove on the lens frame which supports the ring-shaped connecting member to be rotatable.

To achieve the object mentioned above, according to the present invention, there is provided a focus adjustment mechanism upon assembly of an AF compact camera including a lens frame that supports a focusing lens having a male helicoid on the outer periphery thereof; a shutter unit provided with a female helicoid to be engaged with the male helicoid of the lens frame, and an AF driving lever to be rotatively driven along an arc of an axis which is substantially common to the axis of the female helicoid by an amount corresponding to the object distance information. The focus adjustment mechanism also includes a ring-shaped connecting member having an arm to be engaged with the AF driving lever. The ring-shaped connecting member is rotatable relative to the lens frame of the focusing lens for the focus adjustment upon assembly and fixed on the lens frame after completion of the focus adjustment. The lens frame has a cylindrical engagement surface which engages with the ring-shaped connecting member from the front of the cylindrical engagement surface; and a plurality of engaging portions with intervals in a circumferential direction to be engaged with an adjuster, which also has a plurality of engaging portions, for rotation of the lens frame.

Preferably a contact wall is provided, formed on the rear of the cylindrical engagement surface to define the position of the ring-shaped connecting member in an optical axis direction.

Preferably, the adjuster has a pressing end surface by which the ring-shaped connecting member is press-fitted between the pressing end surface and the contact wall.

Preferably, the lens frame and the ring-shaped connecting member are fixed by an adhesive after the completion of the adjustment of relative rotation between the lens frame and the ring-shaped connecting member by the adjuster.

Preferably, the ring-shaped connecting member is an incomplete spring-ring to be in close contact with said cylindrical engagement surface.

According to another aspect of the present invention, there is also provided a focus adjustment mechanism upon assembly of an AF compact camera including a lens frame, that supports a focusing lens, having a male helicoid on the outer periphery thereof. The lens frame has, on the front outer surface thereof, a cylindrical engagement surface and a plurality of engaging portions with intervals in a circumferential direction. This focus adjust mechanism also includes a shutter unit provided with a female helicoid to be engaged with the male helicoid of the lens frame and an AF driving lever to be rotatively driven along an arc of an axis which is substantially common to the axis of the female helicoid by an amount corresponding to the object distance information; a ring-shaped connecting member having an arm to be engaged with the AF driving lever, the ring-shaped connecting member is engaged with the cylindrical engagement surface of the lens frame; and an adjuster having a plurality of engaging portions which are engaged with the engaging portions of the lens frame, the adjuster is engaged with the lens frame for rotating the lens frame upon focus adjustment upon assembly and is removed from said lens frame after completion of the focusing adjustment.

According to another aspect of the present invention, there is also provided a method for adjusting the focus upon assembly of an AF compact camera. The AF compact camera has a lens frame for supporting a focusing lens having a male helicoid on the outer periphery thereof. The lens frame has a cylindrical engagement surface at the front outer surface and a plurality of engaging portions with intervals in a circumferential direction formed at the front end surface. This AF compact camera also has a shutter unit provided with a female helicoid to be engaged with the male helicoid of the lens frame, and an AF driving lever to be rotatively driven along an arc of an axis which is substantially common to the axis of the female helicoid by an amount corresponding to object distance information. Also included is a ring-shaped connecting member having an arm to be engaged with the AF driving lever.

The above-mentioned method has the following steps: the engaging of the ring-shaped connecting member to the cylindrical engagement surface from the front of the lens frame, so that the arm of the ring-shaped connecting member is engaged with the AF driving lever of the shutter unit (the AF driving lever of the shutter unit is kept at a position corresponding to an infinite object photographing position); the engaging of a plurality of engaging portions of an adjuster with the engaging portions of the lens frame; the rotating of the lens frame by the adjuster, observing a focusing state of a whole lens system including said focusing lens, until said focusing state becomes an infinite object photographing state; and the fixing of the ring-shaped connecting member to said lens frame.

Preferably, an adhesive is used for the step for fixing the ring-shaped connecting member to the lens frame.

This present disclosure relates to subject matter contained in Japanese Patent Application No.09-27951 (filed on Feb. 12, 1997) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
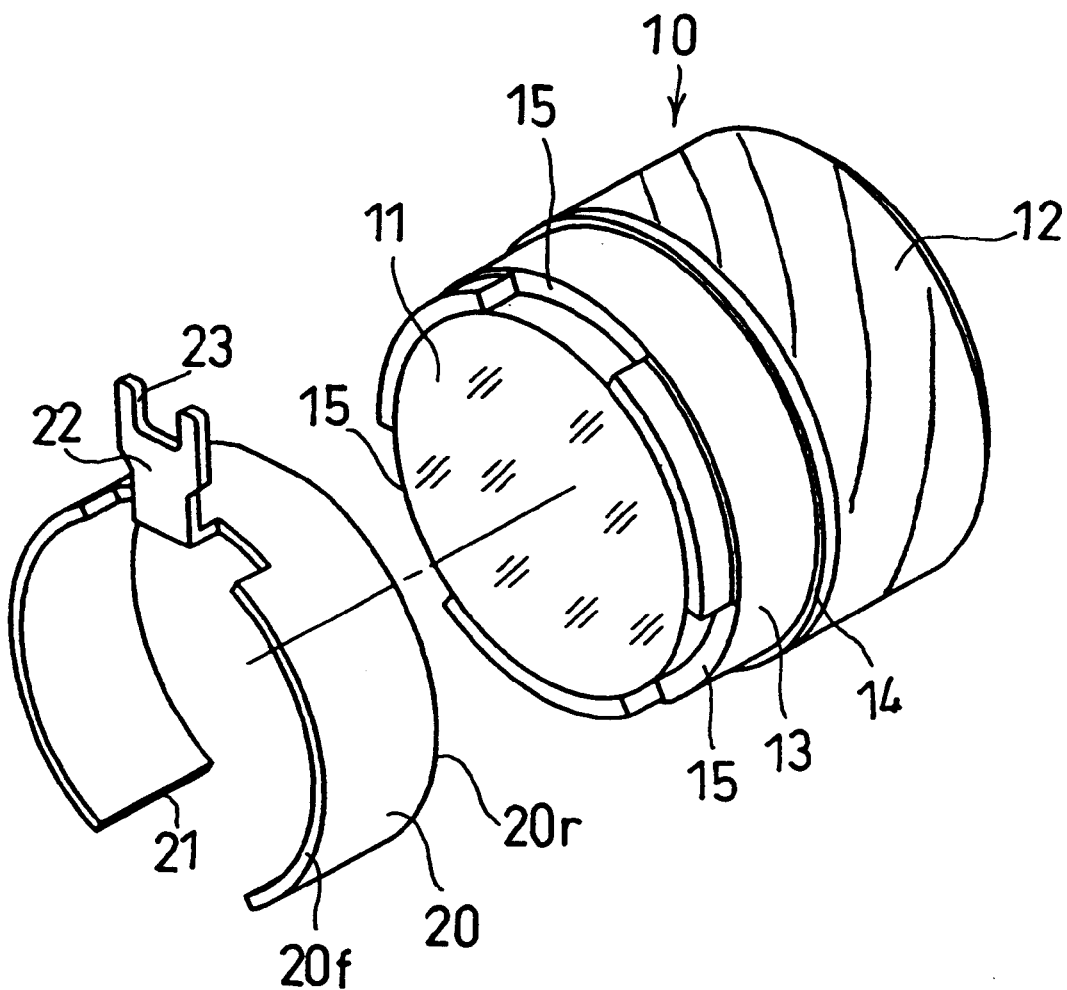
FIG. 1 is an exploded perspective view of a focus adjustment mechanism upon assembly of an AF compact camera according to an embodiment of the present invention.

The present invention will now be described with reference to drawings attached hereto. As illustrated in FIG. 1, a lens frame 10 on which a focusing lens 11 is fixed is provided with a male helicoid 12 and a cylindrical engagement surface 13 on the outer periphery thereof. The cylindrical engagement surface 13 is located in front of the male helicoid 12 and a circular contact wall 14 is formed at the rear of the cylindrical engagement surface 13 (at the boundary of the cylindrical engagement surface 13 and the male helicoid 12). The contact wall 14 is a plane surface perpendicular to an optical axis. A plurality of (in the present embodiment, three) engagement hollows 15 are provided at regular intervals in the circumferential direction at the top (front) end surface of the lens frame 10.

A ring-shaped connecting member 20 is engaged with the cylindrical engagement surface 13 of the lens frame from the front of the cylindrical engagement surface 13. The ring-shaped connecting member 20 is an incomplete ring with a discontinuous section (opening) 21. Preferably, the diameter of the ring-shaped connecting member 20 in a free state is a little smaller than that of the cylindrical engagement surface 13, so that the ring-shaped connecting member 20 may be in close (tight) contact with the cylindrical engagement surface 13 by a spring force when being engaged with each other, thus the ring-shaped connecting member 20 can not easily disengage itself from the cylindrical engagement surface 13. The diameter (i.e., the spring force) of the ring-shaped connecting member 20 is determined so that it can rotate relative to the cylindrical engagement surface 13 needing only a small amount of force to do so.

The ring-shaped connecting member 20 is integrally provided with a radial arm 22 extended in a radial direction therefrom. A bifurcate fork 23 which receives an AF driving lever (pin) 33 is provided at the top of the radial arm 22. The radial arm 22 is positioned in the rear relative to front end surface 20f of the ring-shaped connecting member 20 (namely, closer to the circular contact wall 14 than the front end surface 20f). The width of the ring-shaped connecting member 20 is determined as to be no shorter than the front part of the lens frame 10 from the circular contact wall 14 in the optical axis direction. In other words, the ring-shaped connecting member 20 generally protrudes from the front end of the lens frame 10 when the rear end surface 20r of connecting member 20 is in contact with the contact wall 14.

Figure 2:
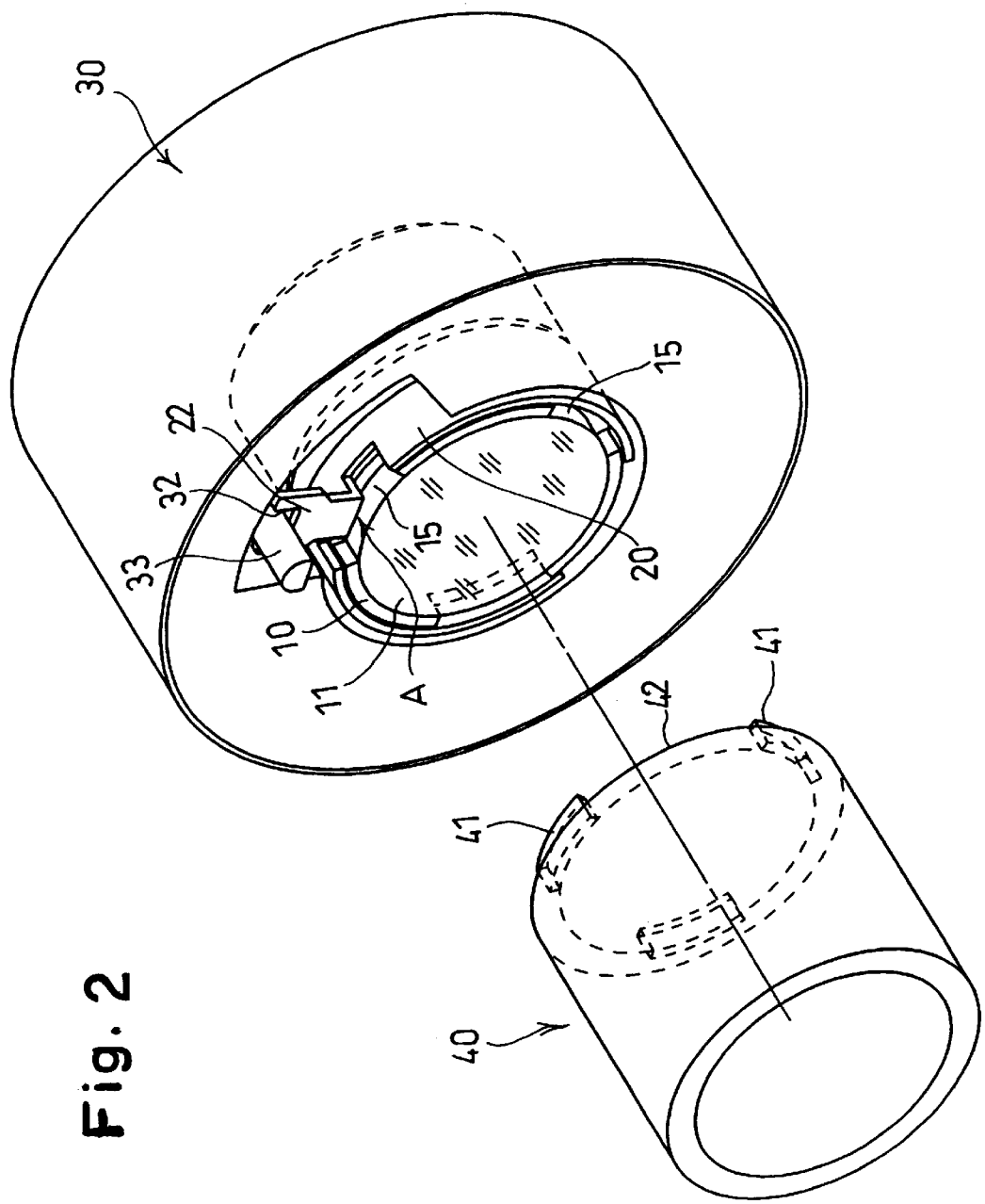
FIG. 2 is a perspective view showing a relation of a focusing lens to an adjuster.
Figure 3:
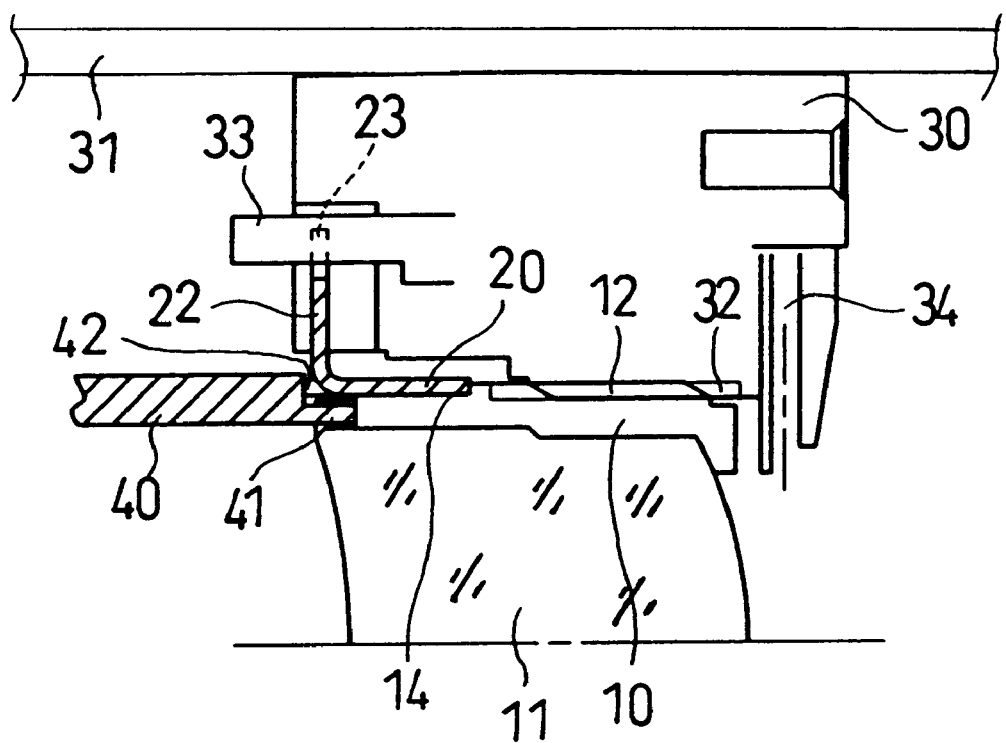
FIG. 3 is a sectional view showing an adjusting state by the adjuster according to the present invention.

As illustrated in FIGS. 2 and 3, a shutter unit 30 in a ring shape is fixed on one of the cylindrical members 31 of a lens barrel for an AF compact camera (see FIG. 3). The shutter unit 30 is provided with a female helicoid 32 at the center thereof to be engaged with the male helicoid 12 of the lens frame 10 (see also FIG. 3). As illustrated in detail in FIG. 3, the shutter unit 30 is also provided with an AF driving lever (pin) 33 to be rotatively driven, by an amount corresponding to object distance information, along an arc of an axis of which is substantially common to that of the female helicoid 32. The shutter unit 30 is further provided with one or more shutter blades 34 to be opened or closed corresponding to object brightness information. The fork 23 of the ring-shaped connecting member 20 is engaged with the AF driving lever 33 without allowing any play in the circumferential direction.

Referring back to FIG. 2, an adjuster (adjusting cylindrical jig) 40 of cylindrical shape is shown. The adjuster 40 is provided, on one end surface thereof, with three (in the present embodiment) engagement protrusions 41, and a pressing surface 42 to place and press the ring-shaped connecting member 20 between the pressing surface 42 and the circular contact wall 14 in a state that the engagement protrusions 41 and the engagement hollows 15 are in engagement with each other. The relation between the hollow and the protrusion in regard to the engagement hollows 15 and the engagement protrusions 41 may be vice versa.

In the thus described mechanism according to the present embodiment, the adjustment of focusing lens upon assembly, for example, is carried out by the following manner. The AF driving lever 33 of the shutter unit 30 is maintained at an infinity photographing position and the female helicoid 12 of the lens frame 10 is engaged with the male helicoid 32 of the shutter unit 30 so that the lens frame 10 is preferably maintained near the infinity photographing position. The ring-shaped connecting member is engaged with the cylindrical engagement surface 13 of the lens frame 10 in advance, in a state that the fork 23 of the radial arm 22 is engaged with the AF driving lever 33 which is held at the infinity photographing position as mentioned above. In this state, the engagement protrusions 41 of the adjuster 40 with the engagement hollows 15 of the lens frame 10, so that the ring-shaped connecting member 20 is press-fitted via the pressing surface 42 and the circular contact wall 14 of the lens frame 10. Namely, a rear end surface 20r of the ring-shaped connecting member 20 is in close contact with the circular contact wall 14, and the front end surface 20f thereof is also in close contact with the pressing surface 42. In such a state, the movement of the ring-shaped connecting member 20 in the optical axis direction is not allowed, while the rotation thereof is allowed.

In the above setting state, the lens frame 10 is rotated by means of the adjuster 40 whilst observing the focus state of the whole lens system including the focusing lens 11. Due to the relationship between the male helicoid 12 and the female helicoid 32, the lens frame 10 varies the position in the optical axis direction through rotation thereof. Accordingly, once the focusing state of the lens frame 10 (the whole lens system) reaches an infinity photographing state, the adjustment is completed. During the adjustment of the lens frame 10 through the rotation thereof, the fork 23 of the ring-shaped connecting member 20 is kept engaged with the AF driving lever 33 which does not move. Therefore the lens frame 10 makes relative rotation in relation to the ring-shaped connecting member 20 which maintains a fixed position.

After the completion of the focus adjustment upon assembly according to the above mentioned method, the adjuster 40 is removed, and the ring-shaped connecting member 20 is adhered to the lens frame 10. The adhesive therefor may be placed, for example, in a space between one of the engagement hollows 15 of the lens frame 10 and the radial arm 22 of the ring-shaped connecting member 20, which is shown by a reference letter A in FIG. 2. Accordingly, after completion of the focus adjustment and the adhesion, when the AF driving lever 33 rotates by an amount based on the object distance information, the lens frame 10 correspondingly rotates to move in the optical axis direction. Thus the accurate focusing can always be obtained.

Figure 4:
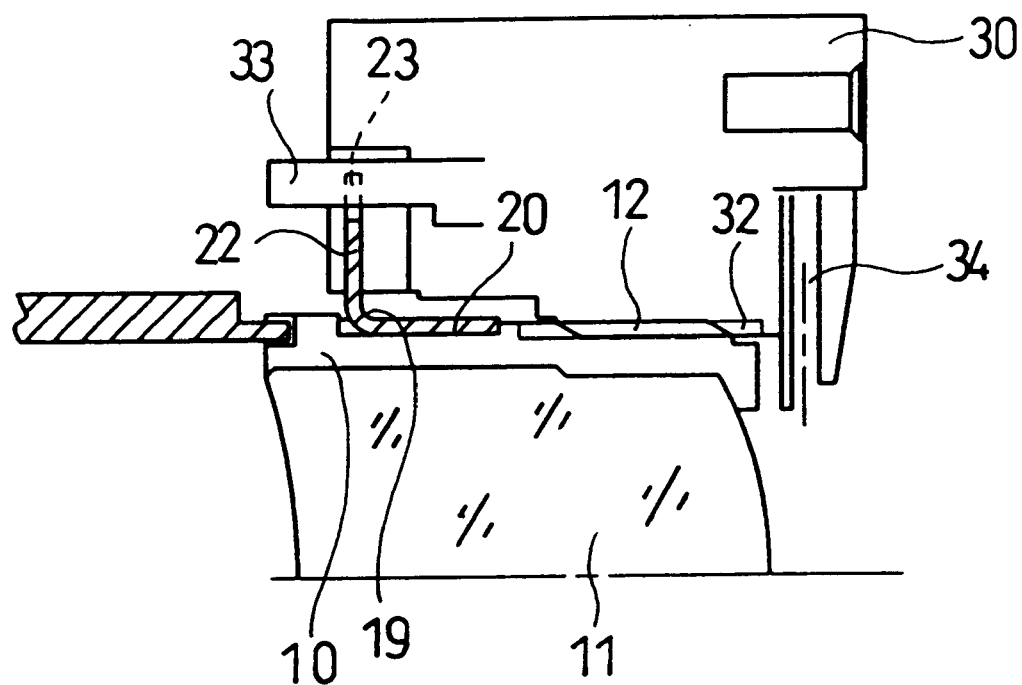
FIG. 4 is a sectional view showing a similar type of focus adjustment mechanism upon assembly in a prior art as compared with FIG. 3.

FIG. 4 illustrates a similar mechanism according to a prior art for the sake of comparison. A supporting groove 19 is provided on the outer periphery of the lens frame 10 to support the ring-shaped connecting member 20. The ring-shaped connecting member 20 can only rotate, and the movement thereof in the optical axis direction is prohibited due to existence of the supporting groove 19. However, as compared with the case of FIG. 4, the case of FIG. 3 (the present embodiment) accomplishes the minimum sizing of the lens frame 10 in the optical axis direction.

As described above, according to the embodiment of the present invention, the forming of the supporting groove is not required on the lens frame of the focusing lens of the AF compact camera, which has been used for supporting the ring-shaped connecting member in a state that only the rotation thereof is allowed without permitting movement in the optical axis direction. Thus the overall size of mechanism of focus adjustment upon assembly can be minimized.

In the above-described embodiment, the member to which the shutter unit 30 is fixed is merely referred to as the cylindrical member 31, and the structure surrounding the cylindrical member 31 is not described. However, any member corresponding to this cylindrical member 31 is sure to exist as long as the camera has an AF mechanism. In addition, the present invention does not relate to the structure of the front or rear of the shutter unit 30. Therefore such a structure will not be shown in the present invention.

The present invention is not limited to the embodiment as above described, and modification and variation of the invention can be made without departing from the spirit and scope of the invention.

What is claimed is:

1. A focus adjustment mechanism upon assembly of an AF compact camera, comprising:
    a lens frame having a male helicoid on the outer periphery thereof, said lens frame supporting a focusing lens;
    a shutter unit provided with a female helicoid to be engaged with said male helicoid of said lens frame, and an AF driving lever to be rotatively driven along an arc of an axis which is substantially common to the axis of said female helicoid by an amount corresponding to the object distance information; and
    a ring-shaped connecting member having an arm to be engaged with said AF driving lever, said ring-shaped connecting member being rotatable relative to said lens frame of said focusing lens for said focus adjustment upon assembly and fixed on said lens frame after completion of said focus adjustment,
    wherein said lens frame comprises:
        a cylindrical engagement surface to be engaged with said ring-shaped connecting member from the front of said cylindrical engagement surface;
        a contact wall formed on the rear of said cylindrical engagement surface to define position of said ring-shaped connecting member in an optical axis direction; and
        a plurality of engaging portions with intervals in a circumferential direction to be engaged with an adjuster for rotation of said lens frame;
    and said adjuster comprising:
        a plurality of engaging portions to be engaged with said engaging portions of said lens frame; and
        a pressing end surface by which said ring-shaped connecting member is press-fitted between said pressing end surface and said contact wall.

2. The focus adjustment mechanism upon assembly of AF compact camera according to claim 1, wherein said lens frame and said ring-shaped connecting member are fixed by an adhesive after completion of said adjustment of relative rotation between said lens frame and said ring-shaped connecting member by said adjuster.

3. The focus adjustment mechanism upon assembly of AF compact camera according to claim 1, wherein said ring-shaped connecting member is an incomplete spring-ring to be in close contact with said cylindrical engagement surface.

4. A focus adjustment mechanism upon assembly of an AF compact camera, comprising:
    a lens frame, that supports a focusing lens, having a male helicoid on the outer periphery thereof, said lens frame having a cylindrical engagement surface on the front outer surface thereof and a plurality of engaging portions with intervals in a circumferential direction formed on the front end surface thereof;
    a shutter unit provided with a female helicoid to be engaged with said male helicoid of said lens frame and an AF driving lever to be rotatively driven along an arc of an axis which is substantially common to the axis of said female helicoid by an amount corresponding to object distance information;
    a ring-shaped connecting member having an arm to be engaged with said AF driving lever, said ring-shaped connecting member being engaged with said cylindrical engagement surface of said lens frame; and
    an adjuster having a plurality of engaging portions which are engaged with said engaging portions of said lens frame, said adjuster being engaged with said lens frame for rotating said lens frame upon focus adjustment upon assembly and being removed from said lens frame after completion of said focusing adjustment upon assembly.

5. A method for adjusting the focus upon assembly of an AF compact camera, said AF compact camera comprising:
    a lens frame for supporting a focusing lens having a male helicoid on the outer periphery thereof, said lens frame having a cylindrical engagement surface at the front outer surface and a plurality of engaging portions with intervals in a circumferential direction formed at the front end surface thereof;
    a shutter unit provided with a female helicoid to be engaged with said male helicoid of said lens frame, and an AF driving lever to be rotatively driven along an arc of an axis which is substantially common to the axis of said female helicoid by an amount corresponding to object distance information; and a ring-shaped connecting member having an arm to be engaged with said AF driving lever, wherein said method comprising steps of:

engaging said ring-shaped connecting member to said cylindrical engagement surface from the front of said lens frame in a state that said arm of said ring-shaped connecting member is engaged with said AF driving lever of said shutter unit, said AF driving lever of said shutter unit being kept at a position corresponding to an infinite object photographing position;

engaging a plurality of engaging portions of an adjuster with said engaging portions of said lens frame;

rotating said lens frame by said adjuster, observing a focusing state of a whole lens system including said focusing lens, until said focusing state becomes an infinite object photographing state; and fixing said ring-shaped connecting member to said lens frame.

6. The method for adjusting the focus upon assembly of an AF compact camera according to claim 5, wherein an adhesive is used for said step for fixing said ring-shaped connecting member to said lens frame.

* * * * *